(12) United States Patent  (10) Patent No.: US 9,395,496 B2
Byer et al.  (45) Date of Patent: Jul. 19, 2016

(54) UNIVERSAL FIBER OPTIC CONNECTOR

(71) Applicant: IPG Photonics Corporation, Oxford, MA (US)

(72) Inventors: Mark W. Byer, Mountain View, CA (US); Manuel J. Leonardo, San Francisco, CA (US); Gregory L. Keaton, San Francisco, CA (US)

(73) Assignee: IPG Photonics Corporation, Oxford, MA (US)

( * ) Notice: Subject to any disclaimer, the term of this patent is extended or adjusted under 35 U.S.C. 154(b) by 0 days.

(21) Appl. No.: 14/850,788

(22) Filed: Sep. 10, 2015

(65) Prior Publication Data

US 2016/0004015 A1   Jan. 7, 2016

Related U.S. Application Data

(63) Continuation of application No. PCT/US2014/026686, filed on Mar. 13, 2014.

(60) Provisional application No. 61/782,715, filed on Mar. 14, 2013.

(51) Int. Cl.
*G02B 6/38* (2006.01)
*G02B 6/32* (2006.01)
*G02B 6/36* (2006.01)

(52) U.S. Cl.
CPC ............... *G02B 6/3809* (2013.01); *G02B 6/32* (2013.01); *G02B 6/3628* (2013.01)

(58) Field of Classification Search
CPC .................................................... G02B 6/3809
USPC ........................................................ 385/70
See application file for complete search history.

(56) References Cited

U.S. PATENT DOCUMENTS

| | | | |
|---|---|---|---|
| 5,653,897 A | 8/1997 | Findlan et al. | |
| 7,443,903 B2 | 10/2008 | Leonardo et al. | |
| 7,469,081 B2 | 12/2008 | Byer et al. | |
| 7,529,281 B2 | 5/2009 | Leonardo et al. | |
| 7,941,019 B1* | 5/2011 | Brooks .............. | G02B 6/02347 359/341.3 |
| 8,009,705 B2 | 8/2011 | Keaton et al. | |
| 8,160,113 B2 | 4/2012 | Adams et al. | |
| 9,008,132 B2 | 4/2015 | Keaton et al. | |
| 2004/0184726 A1 | 9/2004 | Miao et al. | |
| 2005/0068776 A1* | 3/2005 | Ge ......................... | F21K 9/135 362/296.08 |

(Continued)

FOREIGN PATENT DOCUMENTS

WO   2012040394 A2   3/2012

OTHER PUBLICATIONS

International Search Report and Written Opinion for International Application No. PCT/US2014/026686, dated Jul. 14, 2014.

(Continued)

*Primary Examiner* — Jerry Blevins
(74) *Attorney, Agent, or Firm* — Joshua D. Isenberg; JDI Patent

(57) ABSTRACT

A universal fiber optic connector includes a housing and a fiber attachment element configured to attach an optical fiber in the housing. The attachment element positions the optical fiber such that an end face of the fiber is held within the housing. The fiber end face is positioned such that a beam of light emerging from the fiber end face has a defined wavefront located at a specified interface.

17 Claims, 2 Drawing Sheets

(56) References Cited

U.S. PATENT DOCUMENTS

2007/0116411 A1* 5/2007 Benton ............... G02B 6/3825
                                                                    385/53
2008/0279503 A1   11/2008 Jones
2009/0136178 A1    5/2009 Pirastu

OTHER PUBLICATIONS

U.S. Appl. No. 61/782,715, to Mark W. Byer, filed Mar. 13, 2014.
U.S. Application No. PCT/US2014/026686, to Mark W. Byer, filed Mar. 13, 2014.

* cited by examiner

UNIVERSAL FIBER OPTIC CONNECTOR

CLAIM OF PRIORITY

This application is a continuation of commonly-assigned, co-pending International Application Number PCT/US14/26686, filed Mar. 13, 2014, the entire disclosure of which is incorporated herein by reference. International Application Number PCT/US14/26686 claims the priority benefit of commonly-assigned, U.S. Provisional Patent Application No. 61/782,715, filed Mar. 14, 2013, the entire disclosure of which is incorporated herein by reference.

FIELD OF THE DISCLOSURE

The present disclosure relates to fiber optic systems, and in particular, to connectors for high power optical fibers having different beam sizes.

BACKGROUND

When trying to build fiber laser systems (including fiber amplifiers connected to their pump and seed sources), we have been frustrated by the lack of quick, snap-together connectors for high power fibers.

For example, although the SMA connector is suitable for high-power, multimode fiber (typical core diameters of 100 µm to 400 µm), it cannot be used for single mode fiber (typical mode diameters of 6 µm to 30 µm), because the SMA connector cannot provide the tolerance required to align to such a small spot.

One connector that can be used for single mode fibers is the FC/PC connector. However, this connector was designed for low powers, such as are used in telecommunications. The FC/PC connector cannot reliably be used above one Watt of power.

Another problem with the standard connectors is that they cannot connect fibers of different mode sizes. For example, the output of a single-mode fiber laser with a mode diameter of 6 µm cannot be connected to a large mode area fiber with a mode area of 30 µm.

SUMMARY

According to aspects of the present disclosure, a universal fiber optic connector includes a housing and a fiber attachment element configured to attach an optical fiber in the housing. The attachment element positions the optical fiber such that an end face of the fiber is held within the housing. The fiber end face is positioned such that a beam of light emerging from the fiber end face has a defined wavefront located at a specified interface.

In some implementations, the connector further includes one or more optics, wherein the beam is transmitted through the one or more optics so that it achieves the defined wavefront at the specified interface. In such implementations, the connector the attachment element can be configured to retain the fiber end in a fixed position with respect to the optics. For example, the position of the fiber end may be configured such that the fiber end is centered with respect to an optical axis of the optics and an axis of a light beam emerging from the fiber end is angularly aligned with respect to the optical axis of the optics. When the fiber end is so configured the position of the fiber end and the properties of the optics can be selected such that light emerging from the fiber end has the defined wavefront at the specified interface.

The defined wavefront may be defined in terms of beam spot size and divergence angle at the specified interface.

In some implementations, the housing is designed so that any light that is not coupled into the fiber is controlled, either through scattering, absorption or complete transmission.

There are a number of possible configurations for the attachment element. For example, the attachment element may be a sleeve and adhesive, a glass capillary an adhesive, a metal sleeve or a mechanical fastener.

There are a number of different possible configurations for the housing. For example, the housing can be made of materials that are transparent at a given wavelength or opaque.

Some specific examples of materials for the housing include metal, glass or ceramic.

There are a number of different possible configurations for the defined wavefront. For example, in some implementations, the defined wavefront can be a circular Gaussian beam at its waist. In certain such implementations, a radius of the defined wavefront is large enough that any uncontrolled lateral offset between two the housing and a housing of a second similarly configured universal fiber optic connector does not diminish the power transmitted by more than about 10%, when the universal fiber optic connector and the similarly configured universal fiber optic connector are connected.

In certain implementations, the defined wavefront is collimated.

In one possible implementation, the connector further includes an alignment body configured to constrain degrees of freedom of the housing substantially parallel to a plane of the specified interface. The alignment body may also permit motion in a direction substantially perpendicular to the plane of the specified interface. One example of such an alignment body is a tube.

In certain implementations, the connector further includes an electrical connector configured to transmit electrical current or signals to a similarly configured universal fiber optic connector when the universal fiber optic connector is coupled to the similarly fiber optic connector.

DETAILED DESCRIPTION

Figure 1:
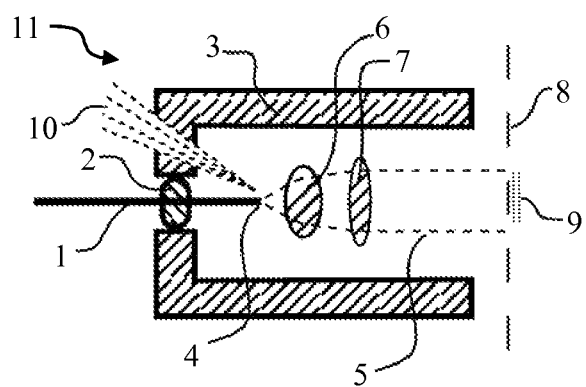
FIG. 1 is a cross-sectional schematic diagram of a universal fiber optic connector according to an aspect of the present disclosure.

Aspects of the present disclosure are directed to fiber optic connectors that can handle high powers and can couple fibers of different mode sizes. The connectors are easily uncoupled and recoupled.

A. Coupling Single Mode Fibers

Each fiber end that is to be connectorized may be fitted with a connection box, referred to herein as a "C-box". The C-box includes optics that relay light from the fiber end to a coupling face of the connection box. The optics of the connection box shape the light beam emitted from the fiber to produce a standard spot size and divergence angle at the coupling face. This standard beam shape is called the "defined wavefront."

By symmetry, the connection box also works in reverse: a light beam that is incident upon the coupling face will be relayed into the fiber, as long as the incident beam has the defined wavefront configuration at the coupling face. This means that when two connection boxes are joined together at their coupling faces, light is relayed between the two corresponding fibers. This works even if the two fibers have different mode sizes.

Fibers of different mode sizes require connection boxes that have different optics inside. Each connection box is designed so that light emitted from its corresponding fiber produces a defined wavefront. Then any two fibers can be connected via connection boxes, since the common interface is the defined wavefront.

B. Defined Wavefront.

By way of example, and not by way of limitation, the defined wavefront may be a circular Gaussian beam at its waist. The radius of the defined wavefront is preferably large enough that any uncontrolled lateral offset between two connection boxes does not appreciably diminish the power transmitted. For example, suppose that two connection boxes can be removably attached with a lateral offset of ±25 μm from perfect alignment. In such a case, the defined wavefront waist radius $w_0$ (defined by the $1/e^2$ point of the intensity) should be at least three times this offset, or 75 μm, to guarantee that at least 90% of the power is transmitted when the connection boxes are coupled.

On the other hand, there is also a maximum size for the universal wavefront, since the coupling between two connection boxes becomes too sensitive to angular misalignment between the boxes when the universal wavefront diameter gets too large. Typically, the connection boxes can be aligned with an angle tolerance of ±25 μrad. To guarantee at least 90% power transmission, the divergence half-angle of the universal wavefront should be at least three times the angle tolerance, or 75 μrad. The divergence half-angle $\theta_d$ can be expressed in terms of the wavelength λ of the light and the mode radius $w_0$ as:

$$\theta_d = \lambda/(\pi w_0) \quad (1)$$

Therefore, to maintain a divergence angle of 75 μrad or more, the mode radius must be less than 4.2 mm.

Therefore, the mode radius of the defined wavefront is preferably between 75 μm and 4.2 mm. To balance the angle tolerance and the lateral offset tolerance, the radius can be the geometric mean between the minimum and maximum sizes. The result is a mode radius of 560 μm.

C. Examples of C-Box Construction

FIG. 1 shows basic construction of a C-Box 11. A fiber 1 is attached by an attachment element 2 in a housing 3. The attachment element 2 may be a sleeve and adhesive, a glass capillary and adhesive, a metal sleeve and mechanical fastener, etc. The housing 3 may be of transparent (at given wavelength) or opaque materials. Either metal, glass or ceramic are the preferred materials for the housing 3. The attachment element 2 positions the fiber such that an end face 4 of the fiber 1 is held within the housing 3 so that it does not move with respect to a defined wavefront 9 located at a specified interface 8. A beam of light 5 emerging from the fiber end face 4 propagates along an axis substantially parallel to the fiber axis. The beam 5 may be transmitted through one or more optics 6 and 7 so that it achieves the defined wavefront 9 at the specified interface 8. The housing 3 may be designed so that any light 10 that is not coupled into the fiber is controlled, either through scattering, absorption or complete transmission.

The attachment element 2 may retain the fiber 1 such that its end 4 is in a fixed position with respect to the optics 6, 7. The position of the fiber end 4 may be configured such that the fiber end is centered with respect to an optical axis of the optics 6, 7 and an axis of the beam 5 emerging from the fiber end 4 is angularly aligned with respect to the optical axis of the optics 6, 7. The position of the fiber end 4 and the properties of the optics 6, 7 are selected such that light emerging from the fiber end has the defined wavefront 9 at the specified interface 8. The defined wavefront 9 may be defined in terms of beam spot size and divergence angle at the specified interface.

Figure 2:
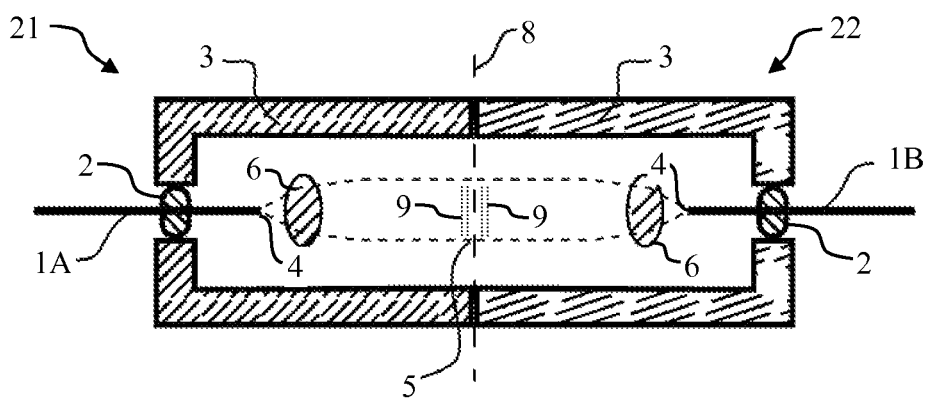
In FIG. 2, a first universal fiber optic connector is shown aligned or connected to a second universal fiber optic connector such that light from a first fiber can be coupled into a second fiber and vice-versa.

In FIG. 2, a first C-box 21 is shown aligned or connected to a second C-box 22 such that the light from a first fiber 1A is coupled into a second fiber 1B and vice-versa. The C-boxes 21 and 22 include optics 6 that are configured such that light emerging from fibers 1A and 1B has a defined wavefront 9 at a defined interface plane 8. For simplicity, a single optic 6 is shown for each C-box. Alternatively, each C-box may contain multiple optics, e.g., as shown in FIG. 1. Because of the defined wavefront 9 at the defined interface plane 8, the two fibers 1A, 1B may be of different Numerical Apertures or diameters.

Figure 3:
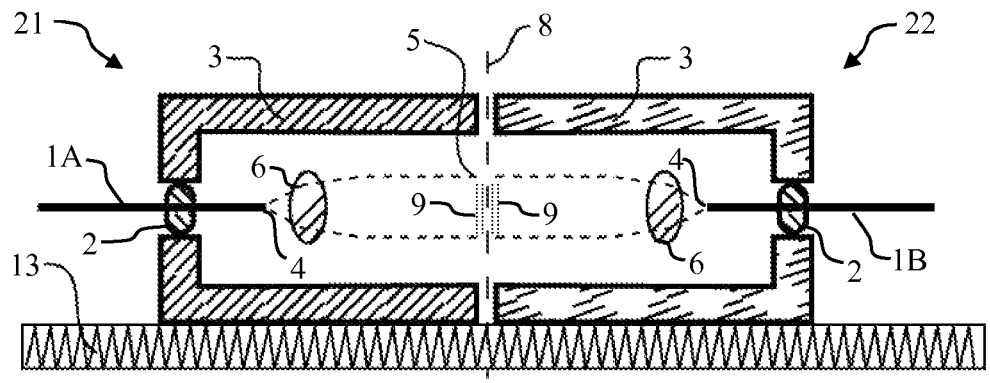
FIG. 3 shows one possible alignment/attachment scheme between two universal fiber optic connectors.

FIG. 3 shows one possible alignment/attachment scheme between two C-boxes. A first C-Box 21 is aligned with respect to the second C-box 22 such that each both defined wavefronts 9 overlap at the defined interface plane 8. In FIG. 3, an external alignment body 13 is used as the master reference. This alignment body may be a v-groove, dovetail, pins or some other means by which to constrain the degrees of freedom substantially parallel to the defined interface plane 8. This permits motion in a direction substantially perpendicular to the defined interface plane 8. If the defined wavefront 9 is collimated, the two C-Boxes 21, 22 would not have to touch in order to transmit light between the coupled fibers.

Figure 4:
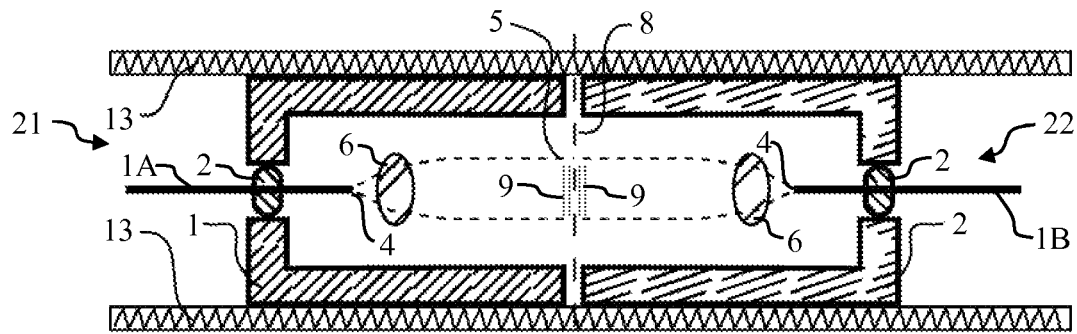
FIG. 4 shows another possible alignment/attachment scheme between two universal fiber optic connectors.

FIG. 4 shows another possible alignment/attachment scheme between two C-boxes. The first C-Box 21 is aligned with respect to the second C-box 22 such that both C-boxes have defined wavefronts 9 that overlap at the defined interface plane 8. In FIG. 4, an external alignment body 13 is used as the master reference. In the example shown in FIG. 4, the alignment body 13 is a critically aligned tube or exterior coupling body. By way of example, and not by way of limitation, glass tubes can be made to exacting tolerances and would provide adequate tolerances. Metal tubes may be used to contain stray uncoupled light. The external alignment body 13 provides means by which to constrain the degrees of freedom substantially parallel to the defined interface plane 8. This permits motion in a direction substantially perpendicular to the defined interface plane. If the defined wavefront 9 is collimated, the two C-Boxes 21, 22 would not have to touch in order to transmit light between the coupled fibers.

Figure 5:
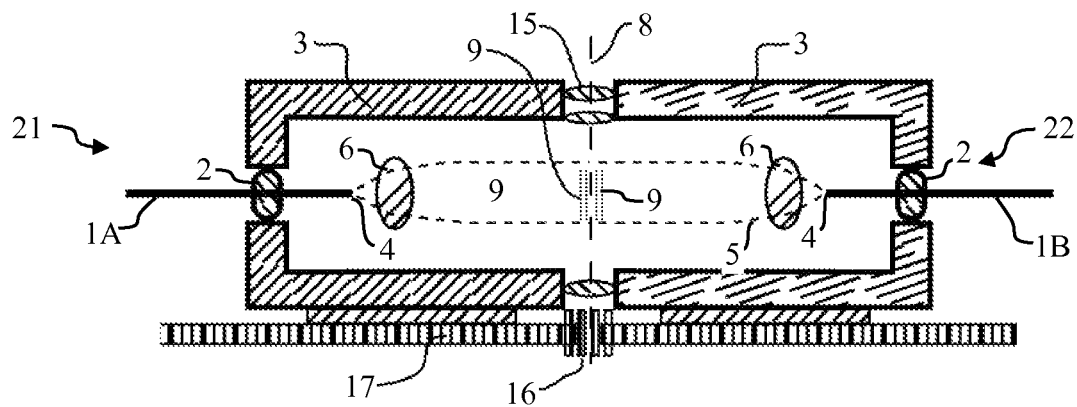
FIG. 5 shows another possible alignment/attachment scheme between two universal fiber optic connectors.

FIG. 5 shows another possible alignment/attachment scheme between two C-boxes 21, 22. The first C-Box 21 is aligned with respect to the second C-box 22 such that each both defined wavefronts 9 overlap at the defined interface plane 8. In FIG. 5, the two C-Boxes 21, 22 are aligned and coupled together by some coupling mechanism 15 such that appropriate tolerances are achieved. For one-time alignments, the coupling mechanism 15 may be mechanically aligned and then affixed with an adhesive or welded in place (etc). For purposes of decoupling, the coupling mechanism 15 may include precision machined features, etched features, micromachined, precision pins, etc. The coupling mechanism maintains sufficiently tight repeatable tolerances substantially perpendicular to the coupling plane 8 such that adequate light coupling between the fibers 1A and 1B is achieved.

Additionally, FIG. 5 shows a mechanism by which electrical signals may also be transmitted. A wire or wires 17 may be secured to the C-Boxes with a connector 16 such that when the first C-box 21 and second C-box 22 are connected, electrical signals or current may pass. Such a connection would enable communication of interlock status or other signals and/or optical monitoring information.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for."

The invention claimed is:

1. A universal fiber optic connector, comprising:
   a housing;
   a fiber attachment element configured to attach an optical fiber in the housing, wherein the attachment element positions the optical fiber such that an end face of the fiber is held within the housing, wherein the fiber end face is positioned such that a beam of light emerging from the fiber end face has a defined wavefront located at a specified interface, wherein the defined wavefront is a circular Gaussian beam at its waist; and
   an alignment body configured to constrain degrees of freedom of the housing substantially parallel to a plane of the specified interface.

2. The connector of claim 1, further comprising one or more optics, wherein the beam is transmitted through the one or more optics so that it achieves the defined wavefront at the specified interface, wherein the housing is designed so that any light that is not coupled into the fiber is controlled, either through scattering, absorption or complete transmission.

3. The connector of claim 2, wherein the attachment element retains the fiber end in a fixed position with respect to the optics.

4. The connector of claim 3, wherein the position of the fiber end is configured such that the fiber end is centered with respect to an optical axis of the optics and an axis of a light beam emerging from the fiber end is angularly aligned with respect to the optical axis of the optics.

5. The connector of claim 4, wherein the position of the fiber end and the properties of the optics are selected such that light emerging from the fiber end has the defined wavefront at the specified interface.

6. The connector of claim 1, wherein the defined wavefront may be defined in terms of beam spot size and divergence angle at the specified interface.

7. The connector of claim 1, wherein the attachment element is a sleeve and adhesive, a glass capillary and adhesive, a metal sleeve or a mechanical fastener.

8. The connector of claim 1, wherein the housing is of transparent (at given wavelength) or opaque materials.

9. The connector of claim 1, wherein the housing is made of metal, glass or ceramic.

10. The connector of claim 1, wherein a radius of the defined wavefront is large enough that any uncontrolled lateral offset between the housing and a housing of a second similarly configured universal fiber optic connector does not diminish the power transmitted by more than about 10%, when the universal fiber optic connector and the similarly configured universal fiber optic connector are connected.

11. The connector of claim 10, wherein a divergence half-angle of the defined wavefront is sufficiently larger than an angular alignment tolerance between the housing and a housing of a second similarly configured universal fiber optic connector such that optical power transmitted between the universal fiber optic connector and the similarly configured fiber optic connector is not diminished by more than about 10% when the universal fiber optic connector and the similarly configured universal fiber optic connector are connected.

12. The connector of claim 1, wherein the defined wavefront is collimated.

13. The connector of claim 1, wherein the alignment body permits motion in a direction substantially perpendicular to the plane of the specified interface.

14. The connector of claim 13, wherein the alignment body is a tube.

15. The connector of claim 1, further comprising an electrical connector configured to transmit electrical current or signals to a similarly configured universal fiber optic connector when the universal fiber optic connector is coupled to the similarly fiber optic connector.

16. The connector of claim 1, wherein a divergence half-angle of the defined wavefront is small enough that any uncontrolled lateral offset between the housing and a housing of a second similarly configured universal fiber optic connector does not diminish the power transmitted by more than about 10% when the universal fiber optic connector and the similarly configured universal fiber optic connector are connected.

17. The connector of claim 1, wherein a divergence half-angle of the defined wavefront is sufficiently larger than an angular alignment tolerance between the housing and a housing of a second similarly configured universal fiber optic connector such that optical power transmitted between the universal fiber optic connector and the similarly configured fiber optic connector is not diminished by more than about 10% when the universal fiber optic connector and the similarly configured universal fiber optic connector are connected.

* * * * *